United States Patent
Oka (10) Patent No.: US 9,838,397 B2
(45) Date of Patent: Dec. 5, 2017

(54) INFORMATION PROCESSING APPARATUS AND CONTROL METHOD THEREOF

(71) Applicant: CANON KABUSHIKI KAISHA, Tokyo (JP)

(72) Inventor: Ryuya Oka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 14/755,966

(22) Filed: Jun. 30, 2015

(65) Prior Publication Data
US 2016/0006742 A1 Jan. 7, 2016

(30) Foreign Application Priority Data

Jul. 2, 2014 (JP) ................................. 2014-137069

(51) Int. Cl.
*G06F 7/04* (2006.01)
*H04L 29/06* (2006.01)
*G06F 17/30* (2006.01)

(52) U.S. Cl.
CPC ...... *H04L 63/102* (2013.01); *G06F 17/30876* (2013.01)

(58) Field of Classification Search
CPC ................................ H04L 63/08; H04L 63/10
USPC ............................................................ 726/4
See application file for complete search history.

(56) References Cited

U.S. PATENT DOCUMENTS

2012/0284335 A1* 11/2012 Chung ................ H04L 63/0414
709/204
2015/0207766 A1* 7/2015 Lindner .................. H04L 51/06
709/206

FOREIGN PATENT DOCUMENTS

JP 2003-150525 A 5/2003

* cited by examiner

*Primary Examiner* — Anthony Brown
(74) *Attorney, Agent, or Firm* — Cowan, Liebowitz & Latman, P.C.

(57) ABSTRACT

An information processing apparatus which manages identification information of a first user and device identification information of a device of the first user in association with each other, manages identification information of a second user and device identification information of a plurality of devices of the second user in association with each other, and controls data transmission and reception between the devices of the first user and the second user. The apparatus receives a request to the second user from the first user, transmits the request from the first user to the plurality of devices of the second user, and notifies a device other than the device that transmitted the permission information among the plurality of devices of the second user of cancellation of the request.

12 Claims, 7 Drawing Sheets

| USER ID (301) | DEVICE ID (302) |
|---|---|
| requestor@email.com | deviceA |
| receiver@email.com | deviceX1 |
| receiver@email.com | deviceX2 |

FIG. 3B

| TRANSMISSION PERMISSION REQUEST ID (311) | TRANSMISSION REQUESTOR ID (312) | RECEIVER ID (313) | TRANSMISSION PERMISSION/ REFUSAL STATUS (314) |
|---|---|---|---|
| 0001 | deviceA | deviceX1 | CURRENTLY CONFIRMING |
| 0001 | deviceA | deviceX2 | CURRENTLY CONFIRMING |

FIG. 3C

| TRANSMISSION PERMISSION REQUEST ID (311) | TRANSMISSION REQUESTOR ID (312) | RECEIVER ID (313) | TRANSMISSION PERMISSION/ REFUSAL STATUS (314) |
|---|---|---|---|
| 0001 | deviceA | deviceX1 | PERMITTED |
| 0001 | deviceA | deviceX2 | CANCELLED |

INFORMATION PROCESSING APPARATUS AND CONTROL METHOD THEREOF

BACKGROUND OF THE INVENTION

Field of the Invention

The present invention relates to a technique for performing data transmission and reception between user devices by using a server.

Description of the Related Art

In a system that performs data transmission and reception between user devices by using a server, for example, a transmission requesting user issues a transmission request from a user device to the server, and the server receives a response indicating transmission permission from a user device designated by the transmission requesting user and then transmits data to the receiver.

If the server does not limit data transmission when data transmission and reception is performed between user devices in such a system, there is a possibility that a malicious user may transmit data that causes harm to an unspecified large number of user devices. Accordingly, it is desirable to configure the server so as to be capable of limiting data transmission and reception between user devices other than pre-set user devices. In order to set a user device with which data transmission and reception can be performed, the transmission requesting user designates a receiver and issues a transmission permission request to the server, and the server receives a response indicating whether or not to allow the transmission permission from the receiver and then stores therein a transmission permission/refusal status.

In relation to the system that performs data transmission and reception between user devices by using a server, Japanese Patent Laid-Open No. 2003-150525 implements a function of issuing an authorization request issued to an authorizer before transmission of a file or email, and if the authorization request is allowed, automatically transmitting the file or email to a receiver.

The transmission permission/refusal status is set in association with the device ID or the like assigned to each user device on the server, but it is conceivable that transmission permission requests are issued by designating email addresses or user IDs that are likely to be known among users.

On the other hand, in the case where the receiving side user uses a plurality of user devices and the device IDs of the user devices are registered in the server, a transmission permission request may be issued to all user devices that are associated with the user ID or an email address serving as the user ID. In this case, the user who received the transmission permission request with the plurality of user devices completes the setting by transmitting, to the server, a response to the transmission permission request by using any one of the user devices registered in the server. However, a user device(s) other than the user device used to transmit the response is in a state in which transmission of a response to the transmission permission request is not completed, and thus the user may be confused whether a response has been made to the transmission permission request when checking with the user device(s) other than the user device used to transmit the response.

According to Japanese Patent Laid-Open No. 2003-150525 described above, by automatically transmitting the authorized file or email to the designated receiver, the burden of requesting authorization performed by the transmission requesting user and the time required from the authorization to the arrival of the file or email to the receiver are reduced. However, in the case where an authorization request is transmitted to a plurality of user devices used by the authorizer, it is necessary to reduce the burden on the authorizer.

SUMMARY OF THE INVENTION

The present invention has been made in consideration of the aforementioned problems, and realizes a technique that enables a user to recognize with which user device the user made a response to a transmission request without making the user confused.

In order to solve the aforementioned problems, the present invention provides an information processing apparatus comprising: a first information management unit configured to manage identification information of a first user and device identification information of a device owned by the first user in association with each other; a second information management unit configured to manage identification information of a second user and device identification information of a plurality of devices owned by the second user in association with each other; and a control unit configured to control data transmission and reception between the device owned by the first user and the devices owned by the second user by associating the identification information of the first user and the identification information of the second user with each other, wherein the control unit is configured to: receive a request to the second user issued from the first user; transmit the request from the first user to the plurality of devices owned by the second user; associate the first user and the second user with each other in response to receiving permission information from one of the devices owned by the second user as a result of the second user performing a permission operation on the device; and notify a device other than the device that transmitted the permission information among the plurality of devices owned by the second user of cancellation of the request.

In order to solve the aforementioned problems, the present invention provides a control method of an information processing apparatus which has an information management unit configured to manage identification information of a first user and device identification information of a device owned by the first user in association with each other and manage identification information of a second user and device identification information of a plurality of devices owned by the second user in association with each other; and a control unit configured to control data transmission and reception between the device owned by the first user and the devices owned the second user by associating the identification information of the first user and the identification information of the second user with each other, the method comprising the steps of: receiving a request to the second user issued from the first user; transmitting the request from the first user to the plurality of devices owned by the second user; associating the first user and the second user with each other in response to receiving permission information from one of the devices owned by the second user as a result of the second user performing a permission operation on the device; and notifying a device other than the device that transmitted the permission information among the plurality of devices owned by the second user of cancellation of the request.

According to the present invention, if a receiving side user having a plurality of user devices makes a response to a transmission request by using any one of the user devices, in a user device(s) other than the user device used to make the response, the transmission permission request is cancelled. Accordingly, the user can recognize that the response to the transmission request was made with one of the user devices without any confusion.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Hereinafter, a system will be described that use smart phones and a management server as user devices and an information processing apparatus according to the present invention, and that performs data transmission and reception between the user devices used by users by using the management server connected to a network. In the present embodiment, the user devices are assumed to be smart phones, which are a type of mobile phones, but the user devices may be image capturing apparatuses such as digital cameras, portable electronic devices such as tablet terminals, or information processing apparatuses such as personal computers (PCs).

System Configuration

A system configuration according to the present embodiment will be described first with reference to FIG. 1.

Figure 1:
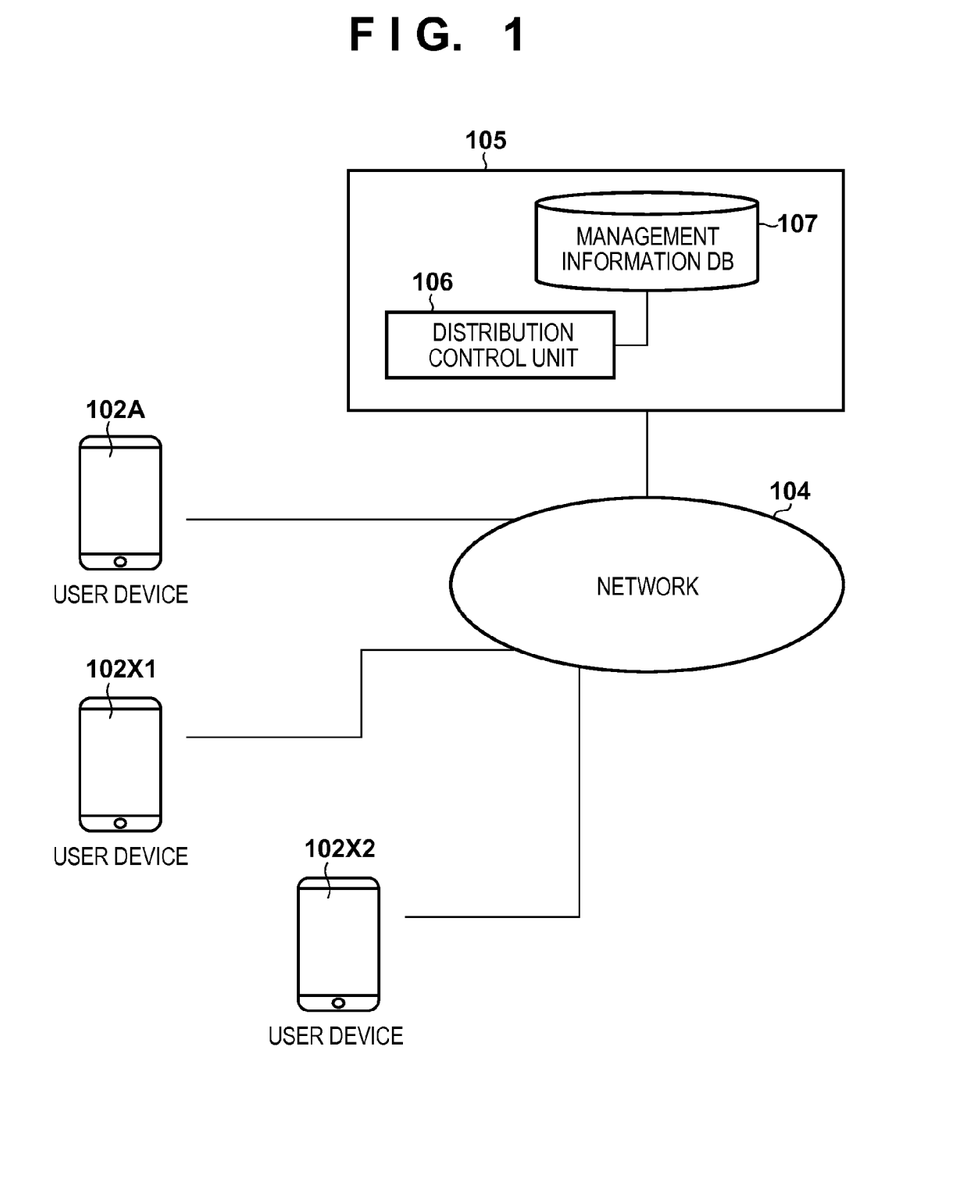
FIG. 1 is a diagram showing a system configuration according to an embodiment of the present invention.

FIG. 1 shows a system configuration according to the present embodiment.

In the system according to the present embodiment, a management server 105 and a plurality of user devices 102 are connected so as to be capable of communication via a network 104.

The system according to the present embodiment is a system constructed to allow transmission and reception of still image files, moving image files, document files and other data between the user devices 102 by using the management server 105. The management server 105 includes, in order to control data transmission and reception between the user devices 102, a management information DB (database) 107 in which information that associates user devices with users serving as a transmission responding user and a transmission requesting user, and management information regarding the transmission permission/refusal status between user devices are stored, and the management server 105 performs information management. The management server 105 also includes a distribution control unit 106 that controls data transmission and reception between the user devices 102. The distribution control unit 106 performs control so as to execute data transmission processing if the transmission permission/refusal status, which will be described later, indicates "permitted", and to not execute data transmission processing if the transmission permission/refusal status indicates "refused" or "cancelled".

Here, operations performed by the management server 105 when a transmission requestor designates a receiver and issues a transmission permission request will be described.

As shown in FIG. 1, it is assumed that the transmission requesting user uses a transmission requestor 102A, and the receiving side user uses receivers 102X1 and 102X2. The transmission requesting user can transmit a transmission permission request to the management server 105 via the transmission requestor 102A by designating identification information that can be uniquely identified the user by the management server 105 such as an email address or user ID of the receiving side user. Upon receiving the transmission permission request from the transmission requestor 102A, the management server 105 generates a transmission permission request ID that can uniquely identify the transmission permission request from other transmission permission requests. Furthermore, the management server 105 acquires, from the management information DB 107 provided in the management server 105, device identification (ID) information of the receivers 102X1 and 102X2 of the receiving side user that are associated with the user ID designated as the receiving side user. The management server 105 associates the generated transmission permission request ID, the device ID of the transmission requestor 102A, the device IDs of the receivers 102X1 and 102X2 acquired from the management information DB 107, and information indicating the transmission permission/refusal status being "currently confirming" with each other, and registers them in the management information DB 107.

The receiving side user acquires the transmission permission/refusal status information from the management server 105 at an arbitrary timing of using the receiver 102X1 or 102X2. The receiving side user can check the transmission permission/refusal status by using the receiver 102X1 or 102X2, and if a transmission permission request is received, the receiving side user can return a response indicating "permitted" or "refused" to the transmission permission request to the management server 105 by operating the device. The management server 105 updates the transmission permission/refusal status information according to the type of the response state received from the receiver 102X1 or 102X2.

Here, the management server 105 determines whether or not the transmission permission/refusal status of a receiver other than the receiver that issued the response, which is associated with the transmission permission request ID received together with the response to the transmission permission request from the receiver 102X indicates "currently confirming". Then, if it is determined as a result of the determination that the transmission permission/refusal status indicates "currently confirming", the transmission permission/refusal status is updated to "cancelled". For example, if a response to the transmission permission request is transmitted from the receiver 102X1 to the management server 105, the management server 105 updates the transmission permission/refusal status that is set in association with the transmission requester 102A and the receiver 102X1 to "permitted" or "refused" according to the received response. Furthermore, the management server 105 updates the transmission permission/refusal status that is set in association with the transmission requester 102A and the receiver 102X2, which is a receiver other than the receiver that transmitted the response, to "cancelled".

With this function, if one (the receiver 102X1 or 102X2) of the plurality of user devices of the receiving side user transmits a response to the transmission permission request to the management server 105, the transmission permission request issued to a device (102X2 or 102X1) other than the device that transmitted the response is cancelled. Accordingly, the user can recognize that one of the devices of the user has responded to the transmission permission request.

For data transmission, at the time of receiving the transmission permission request from the transmission requestor 102A, the management server 105 receives the device ID of the transmission requestor 102A, the email address and user ID of the receiving side user, and the device IDs of the receivers 102X1 and 102X2. The management server 105 acquires, from the management information DB 107, a transmission permission/refusal status corresponding to the user ID and each receiver ID received from the transmission requestor 102A. Then, if the transmission permission/refusal status indicates "permitted", the management server 105 performs control so as to execute data transmission processing. If the transmission permission/refusal status indicates "refused" or "cancelled", or if there is no associated information, the management server 105 performs control so as to not execute data transmission processing.

As long as it is possible to notify the management server 105 of the device ID of the user device 102A that issued the transmission permission request via the network 104 and the device IDs of the user devices 102X1 and 102X2 that responded to the request, such notification may be performed by another user device.

The transmission requestor 102A and the receivers 102X1 and 102X2 are devices having the same functionality except that the users are different. Hereinafter, unless it is necessary to make a distinction between the user devices, they are referred to as the "user device 102".

The user device 102 is a device having an interface that is capable of performing communication with a computation processing apparatus such as a CPU and an external device, and can execute a program having a standard protocol capable of data transmission via the network 104.

The user device 102 executes the program so as to access the management server 105 by using the protocol such as HTTP, transmits information generated in a description language such as XML, and acquires and analyzes information generated in a description language such as HTML or XML.

The user device 102 has a CPU that displays the analyzed information in accordance with a command from the program on a display so as to notify the user of the information.

For the sake of the convenience of the description of the present embodiment, an example was described in which the program executed by the user device 102 makes a transmission permission request and a response, but it may be a dedicated device, a dedicated application or an information processing apparatus that uses a web service via a browser.

Also, the user device 102 may perform encryption such as SSL in order to perform data transmission and reception via the network 104.

Furthermore, the user device 102 may perform data transmission and reception by using an authorized information processing apparatus alone.

Apparatus Configuration

Overall configuration and function of the user device 102 and the management server 105 according to the present embodiment will be described with reference to FIG. 2.

Figure 2:
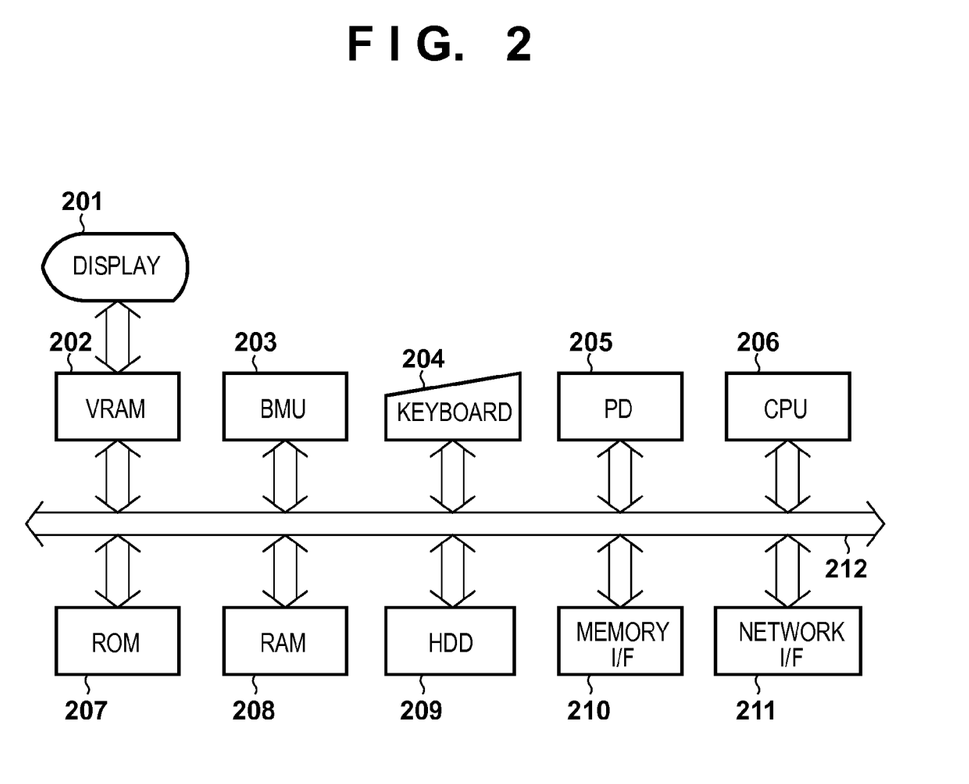
FIG. 2 is a block diagram showing a configuration of user devices and a management server according to the embodiment of the present invention.

As shown in FIG. 2, the user device 102 and the management server 105 includes a display 201, a VRAM 202, a BMU 203, a keyboard 204, a PD 205, a CPU 206, a ROM 207, a RAM 208, a HDD 209, a memory I/F 210, a network I/F 211, and a bus 212.

The display 201 displays, for example, still images, moving images, icons, messages, menus, and other user interface information stored in the user device 102 or the management server 105.

In the VRAM 202, image data for being displayed on the display 201 is rendered. The image data generated in the VRAM 202 is transferred to the display 201 in accordance with a predetermined rule, and the image is thereby displayed on the display 201.

The BMU (bit move unit) 203 controls, for example, data transfer between memories (for example, between the VRAM 202 and another memory), and data transfer between a memory and an I/O device (for example, the network I/F 211).

The keyboard 204 includes various types of keys for inputting characters and the like, and may be a touch panel type keyboard displayed on the display 201.

The PD (pointing device) 205 is used, for example, to point to an icon, a menu or any other content displayed on the display 201 or to perform a drag and drop operation of an object.

The CPU 206 controls the devices based on an OS or a control program stored in the ROM 207 or the HDD 209.

The ROM 207 includes various types of control programs and data (including the management information DB 107) stored therein.

The RAM 208 includes a work area for the CPU 206, a data saving area at the time of error processing, a load area for a control program, and the like.

The HDD 209 includes control programs executed within the user device 102 or the management server 105, temporarily stored data and the like stored therein.

The memory I/F 210 controls reading and writing of data from and to an external storage medium such as a memory card.

The network I/F 211 performs communication with another information processing apparatus, a printer or the like via a network.

The bus 212 includes an address bus, a data bus, and a control bus.

A control program may be provided to the CPU 206 from the ROM 207 or the HDD 209, or from an external device or the like over a network via the network I/F 211.

Data Configuration of Management Information

The management information stored in the management information DB 107 provided in the management server 105 of the present embodiment will be described with reference to FIGS. 3A to 3C.

Figure 3A:
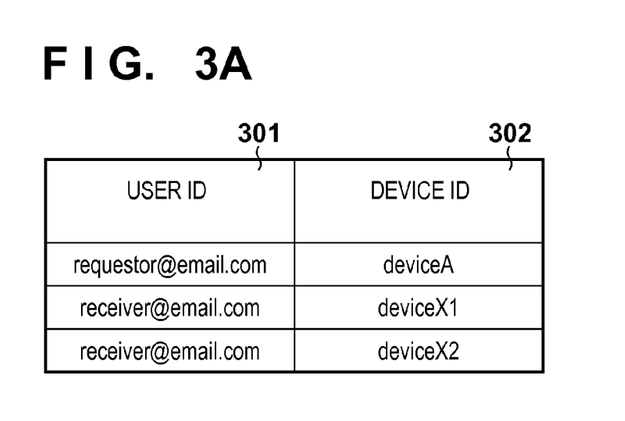
FIG. 3A is a diagram showing an example of first management information regarding user devices registered in a management information DB of the management server according to the embodiment of the present invention.

FIG. 3A shows first management information regarding user devices registered in the management information DB 107 provided in the management server 105. As shown in FIG. 3A, user ID 301 indicates the ID for uniquely identifying a user. Device ID 302 indicates the ID for uniquely identifying a device.

If a user having a user device 102 transmits a request to register the user device 102 to the management server 105, the management server 105 generates a number or character string that does not overlap with other device IDs, and registers the generated number or character string in the management information DB 107 in association with the user ID.

Figure 3B:
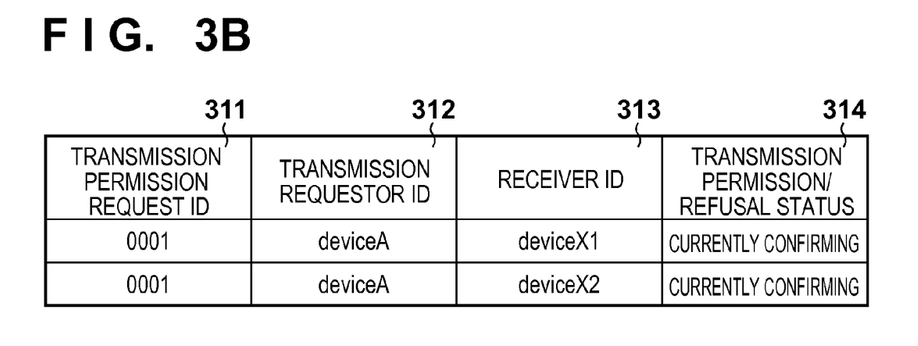
FIGS. 3B and 3C are diagrams showing examples of second management information regarding a transmission permission request registered in the management information DB of the management server according to the embodiment of the present invention.
Figure 3C:
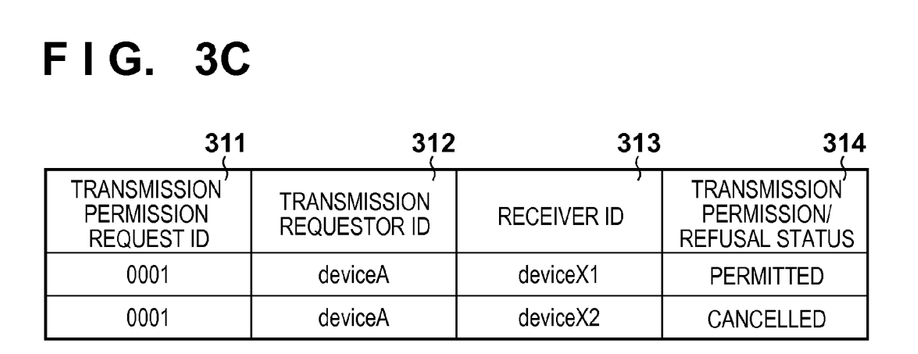

FIG. 3B shows second management information regarding a transmission permission request registered in the management information DB 107 provided in the management server 105. As shown in FIG. 3B, transmission permission request ID 311 indicates the ID for uniquely identifying a transmission permission request generated in response to a transmission permission request. Transmission requestor ID 312 indicates the device ID of a user device 102 of the user who issued the transmission permission request. Receiver ID 313 indicates the device ID of a user device 102 to which the transmission permission request was transmitted. Transmission permission/refusal status 314 indicates the status for determining whether or not to permit transmission between the transmission requestor ID 312 and the receiver ID 313.

If the management server 105 receives, from one of the user devices 102, a response to the transmission permission request together with the transmission permission request ID 311, the transmission requestor ID 312 and the receiver ID 313, the management server 105 updates the transmission permission/refusal status 314 associated with the received information 311 to 313. Furthermore, in the present embodiment, if the transmission permission/refusal status 314 associated with the same transmission permission request ID 311 indicates "currently confirming", the transmission permission/refusal status 314 is updated to "cancelled".

The management server 105 performs information management such as registration of the aforementioned various types of information in the management information DB 107, as well as addition, change and deletion of the registered information.

Transmission Permission Request Processing

Figure 4A:
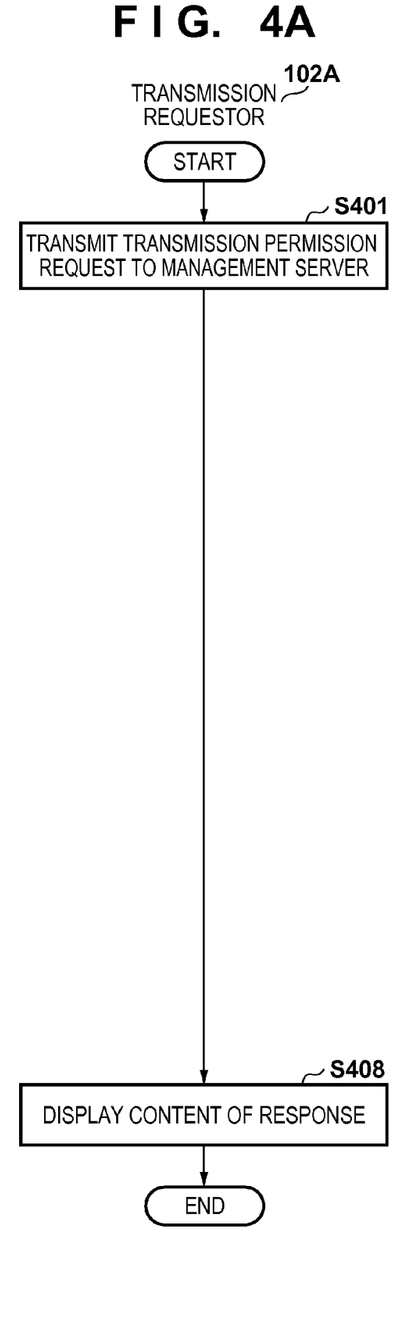
FIGS. 4A and 4B are flowcharts illustrating operations performed by a user device and the management server at the time of issuing a transmission permission request according to the embodiment of the present invention.
Figure 4B:
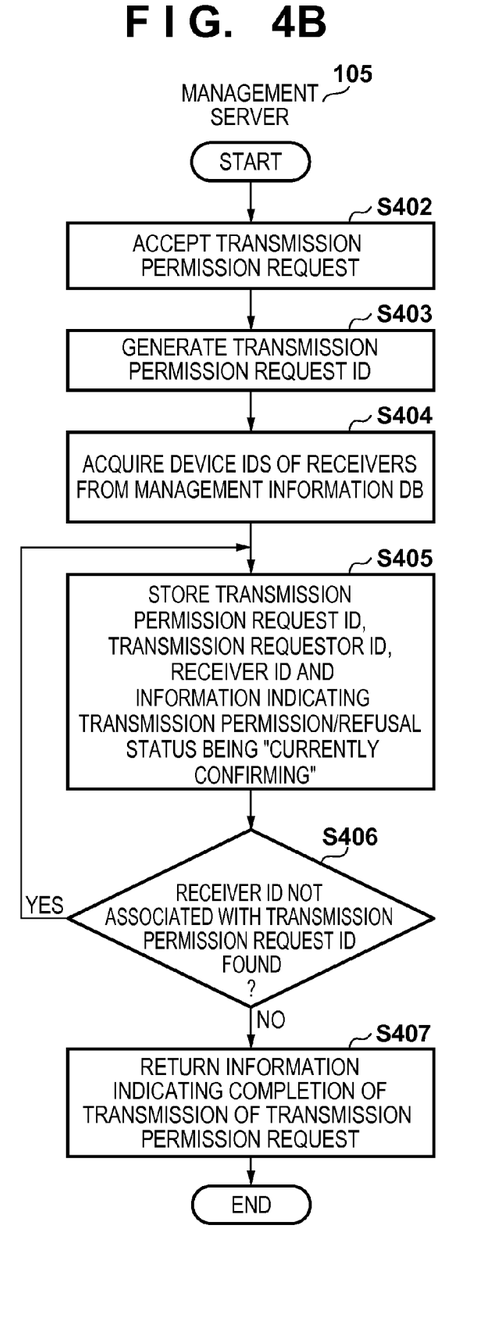

Next is a description of processing for transmitting a transmission permission request from the transmission requestor 102A to the receivers 102X via the management server 105 according to the present embodiment with reference to FIGS. 4A and 4B.

FIG. 4A shows processing performed by the transmission requestor 102A, FIG. 4B shows processing performed by the management server 105, and these processing operations are implemented respectively by the CPU 206 of the user device 102A and the CPU 206 of the management server 105 reading a program stored in the ROM 207 into the RAM 208 and executing the program.

Figure 6A:
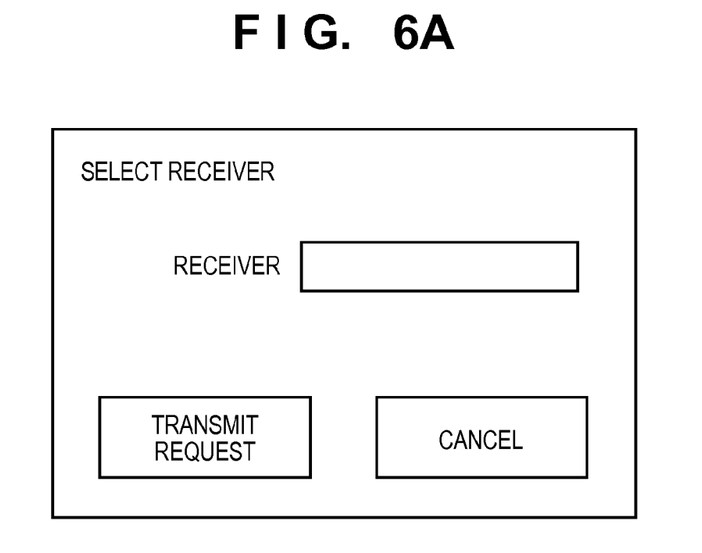
FIGS. 6A and 6B are diagrams showing examples of screens displayed at the time of issuing a transmission permission request and at the time of responding to a transmission permission request, respectively, according to the embodiment of the present invention.

In step S401, the transmission requestor 102A transmits a transmission permission request to the management server 105 by designating the device ID of the transmission requestor 102A as a transmission requestor ID and the user ID of a device to which the request is to be transmitted. FIG. 6A shows an example of a transmission permission request setting screen displayed on the display of the transmission requestor.

In step S402, the management server 105 accepts the transmission permission request received from the transmission requestor 102A.

In step S403, the management server 105 generates a transmission permission request ID for uniquely identifying the transmission permission request.

In step S404, in order to acquire the device IDs of the receivers 102X of the receiving side user, the management server 105 acquires the device IDs 302 associated with the user ID accepted in step S402 from the management information DB 107.

In step S405, the management server 105 associates the transmission permission request ID 311 generated in step S403, the device ID 312 accepted in step S402, the device ID 313 acquired in step S404, and information indicating the transmission permission/refusal status 314 being "currently confirming" with each other, and registers them in the management information DB 107. If a transmission permission request has been made and the transmission permission/refusal status 314 has been updated to "permitted", it is unnecessary to perform this processing. In this case, in step S407, it may be possible to return, to the transmission requestor 102A, information indicating that one of the receivers 102X of the receiving side user has a transmission permission/refusal status 314 of "permitted".

In step S406, the management server 105 determines whether there is a receiver ID that was not associated with the transmission permission request ID in step S405 among the receiver IDs acquired in step S404. If it is determined as a result of the determination that such a receiver ID is found, the procedure proceeds to step S405, and if it is determined that such a receiver ID is not found, the procedure proceeds to step S407.

In step S407, the management server 105 returns, to the transmission requestor 102A, information indicating that the transmission of the transmission permission request to the receivers 102X has been completed.

In step S408, the transmission requestor 102A displays the content of the information received from the management server 105.

Upon completion of the above-described processing, second management information regarding the transmission permission request as shown in FIG. 3B is registered in the management information DB 107.

Processing for Transmitting Response to Transmission Permission Request

Figure 5A:
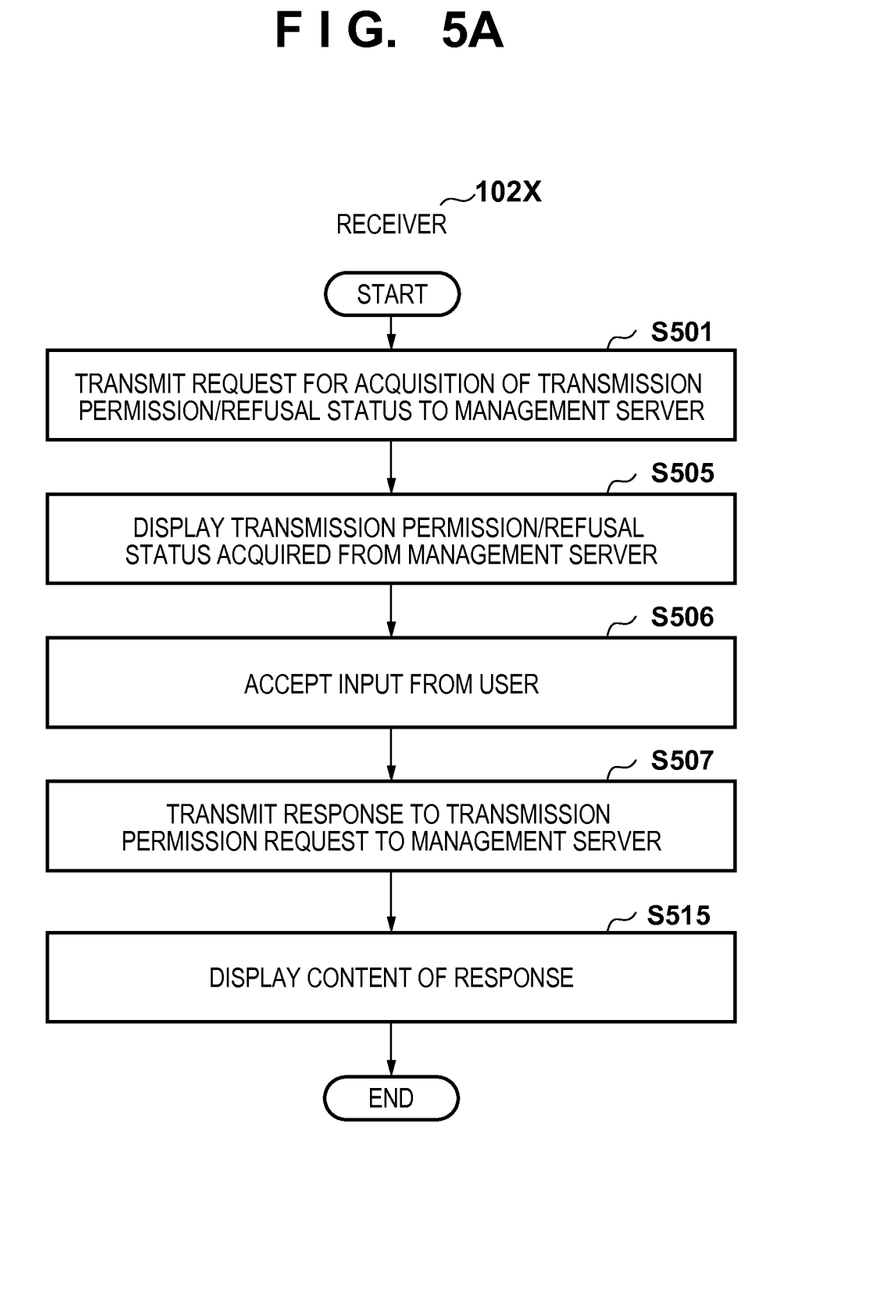
FIGS. 5A and 5B are flowcharts illustrating operations performed by a user device and the management server at the time of responding to a transmission permission request according to the embodiment of the present invention.
Figure 5B:
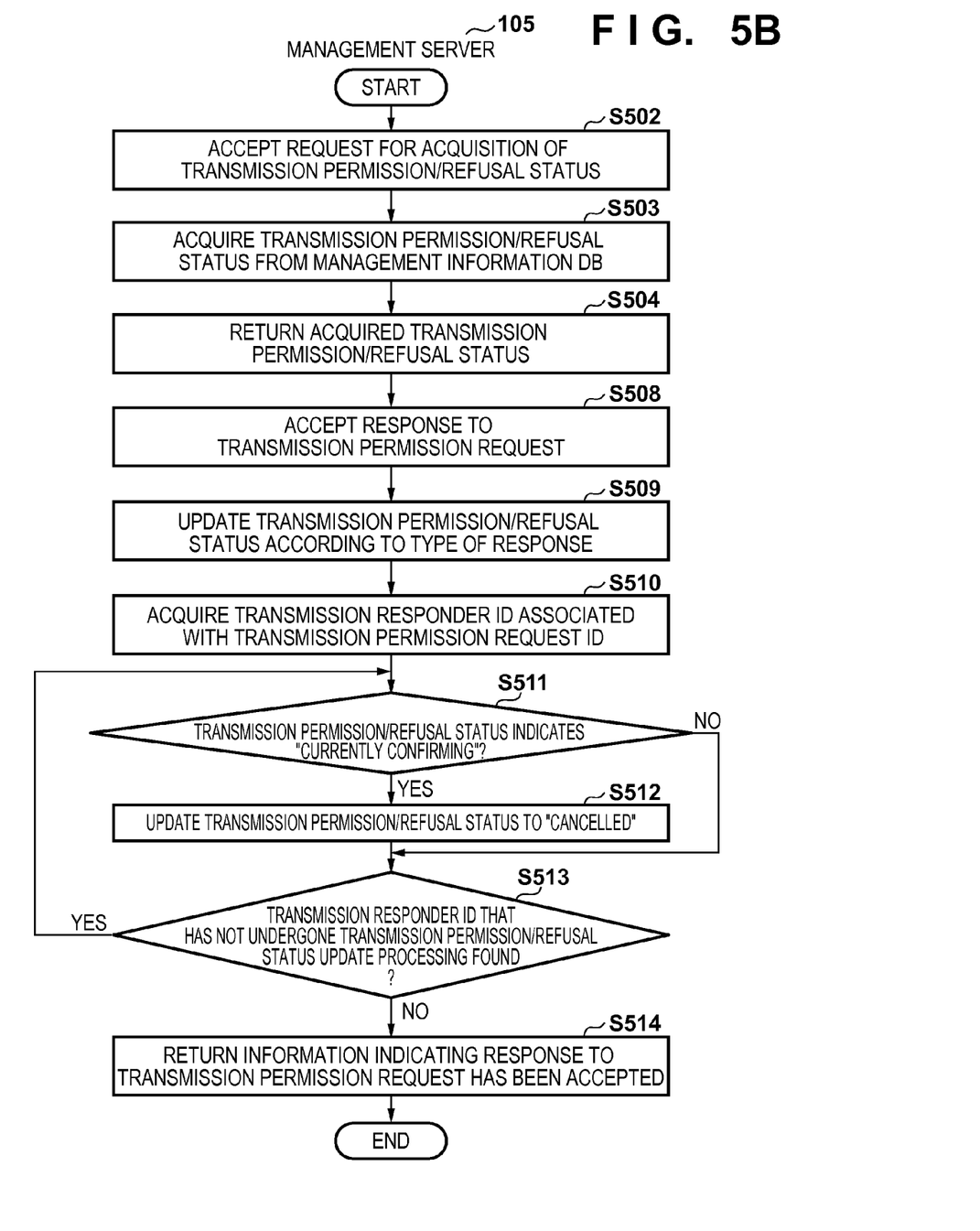

Next is a description of processing for transmitting a response to a transmission permission request from one of the receivers 102X via the management server 105 according to the present embodiment, with reference to FIGS. 5A and 5B.

FIG. 5A shows processing performed by the receiver 102X, FIG. 5B shows processing performed by the management server 105, and these processing operations are implemented by the CPU 206 of the user device 102 and the CPU 206 of the management server 105 reading a program stored in the ROM 207 into the RAM 208 and executing the program.

In step S501, the receiver 102X issues, to the management server 105, a request for acquisition of transmission permission/refusal status together with a receiver ID in order to check the transmission permission request and the transmission permission/refusal status that has already been permitted.

In step S502, the management server 105 accepts the receiver ID and the request for acquisition of transmission permission/refusal status from the receiver 102X.

In step S503, the management server 105 acquires, from the management information DB 107, the transmission permission request ID 311, the transmission requestor ID 312, the receiver ID 313, and the transmission permission/refusal status 314 that are associated with the receiver ID accepted in step S502.

In step S504, the management server 105 returns, to the receiver 102X, the transmission permission/refusal status, the user ID and email address information of the transmission requestor 102A acquired in step S503 in a format that can be read by the receiver 102X.

Figure 6B:
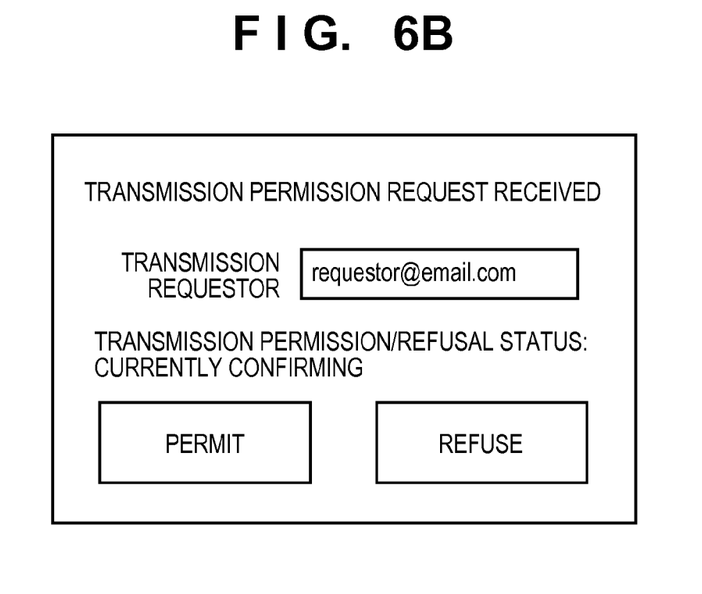

In step S505, the receiver 102X displays information indicating that a transmission permission request has been received from the management server 105 and a response state to the transmission permission request. FIG. 6B shows an example of a transmission permission request notification screen displayed on the display 201 of the receiver 102X. Here, if there are other receiver IDs associated with the same transmission permission request ID, the transmission permission request is transmitted to all receivers 102X having the other receiver IDs.

In step S506, the receiver 102X accepts an input from the user.

In step S507, the receiver 102X transmits, to the management server 105, the transmission requestor ID 312 and the receiver ID 313 acquired in step S505, the transmission permission request ID 311 associated therewith, and a response to the transmission permission request through a user operation.

In step S508, the management server 105 accepts the response to the transmission permission request from the receiver 102X.

In step S509, the management server 105 updates the transmission permission/refusal status 314 corresponding to the transmission permission request ID, the transmission requestor ID and the receiver ID accepted in step S508 to "refused", "permitted" or the like according to the type of the response. In order to cause the receiving side user who made the response to change the transmission permission/refusal status of all receivers 102X registered in the management server 105 to "permitted" after one of the receivers 102X permitted the transmission permission request, it may be possible to perform the update by associating the transmission requestor ID, the device IDs of all receivers used by the receiving side user, and information indicating the transmission permission/refusal status being "permitted" with each other. In addition, in order for data transmission from the receiver 102X to be permitted, it may also be possible to exchange the transmission requestor ID and the receiver ID, and associate and register them with information indicating the transmission permission/refusal status 314 being "permitted".

In step S510, the management server 105 acquires, from the management information DB 107, the receiver IDs 313 associated with the transmission permission request ID accepted in step S508.

In step S511, the management server 105 determines whether or not the transmission permission/refusal status of the transmission requestor ID accepted in step S508 as the transmission requestor ID 312 and the receiver ID acquired in step S510 as the receiver ID 313 indicates "currently confirming". If it is determined as a result of the determination that the transmission permission/refusal status indicates "currently confirming", the procedure proceeds to step S512, and otherwise the procedure proceeds to step S513.

In step S512, the management server 105 updates the transmission permission/refusal status determined in step S511 from "currently confirming" to "cancelled". Instead of updating the transmission permission/refusal status to "cancelled", it may also be possible to update the transmission permission/refusal status of another associated device ID to "already responded", and in step S504 issue a notification indicating that another user device has already responded.

In step S513, the management server 105 determines whether or not there is a receiver ID that has not undergone transmission permission/refusal status update processing in steps S511 and S512 among the receiver IDs acquired in step S510. If as a result of the determination, it is determined that a receiver ID that has not undergone the update processing is found, the procedure proceeds to step S511, and if it is determined that a receiver ID that has not undergone the update processing is not found, the procedure proceeds to step S514.

In step S514, the management server 105 returns, to the receiver 102X, information indicating that the response to the transmission permission request has been accepted and update processing has been completed. Here, if the type of the response from the receiver 102X is "permitted", as shown in FIG. 3C, the management server 105 updates the transmission permission/refusal status of another receiver ID having the same transmission permission request ID 311 registered in the management information DB 107 to "cancelled". Then, the management server 105 issues a notification indicating that the transmission permission request has been cancelled to the user device 102X2, which is a device other than the receiver 102X1 that transmitted "permitted".

In step S515, the receiver 102X displays information indicating that the response to the transmission permission request has been accepted.

According to the present embodiment, if one (102X1 or 102X2) of the receivers of the receiving side user issues, to the management server 105, a response to a transmission permission request, the transmission permission request transmitted to a device 102X2 (or 102X1) other than the device that has responded to the transmission permission request is cancelled. Accordingly, the user can recognize that one of the devices used by that user has responded to the transmission permission request.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-137069, filed Jul. 2, 2014 which is hereby incorporated by reference herein in its entirety.

What is claimed is:

1. An information processing apparatus comprising:
a first information management unit configured to manage identification information of a first user and device identification information of a device owned by the first user in association with each other;
a second information management unit configured to manage identification information of a second user and device identification information of a plurality of devices owned by the second user in association with each other;
a third information management unit configured to manage the device identification information of the device owned by the first user that transmitted a request to the second user for associating the first user and the second user with each other, the device identification information of one of the devices owned by the second user that received the request, and information indicating a response state of a response to the request in association with each other; and
a control unit configured to control data transmission and reception between the device owned by the first user and the devices owned by the second user by associating the identification information of the first user and the identification information of the second user with each other,
wherein the control unit is configured to:
receive the request to the second user issued from the first user, for associating the first user and the second user with each other;
transmit the request from the first user to the plurality of devices owned by the second user;
associate the first user and the second user with each other in response to receiving permission information from one of the devices owned by the second user as a result of the second user performing a permission operation on the device;
transmit a notification for canceling the request to at least one of the devices other than the device that transmitted the permission information among the plurality of devices owned by the second user; and
if there is a device that has already transmitted the permission information among the plurality of devices owned by the second user when the request from the device owned by the first user is received, notify the device owned by the first user of presence of the device that has already transmitted the permission information.

2. The apparatus according to claim 1,
wherein the third information management unit is configured to, upon receiving permission information from any one of the devices owned by the second user that received the request, update the information indicating the response state of the response to the request of a device other than the device that transmitted the permission information to "cancelled" or "permitted".

3. The apparatus according to claim 1,
wherein the control unit is configured to notify the device owned by the first user of a fact that the permission information has been received from one of the plurality of devices owned by the second user in response to the request.

4. The apparatus according to claim 1,
wherein the request includes the device identification information of the device owned by the first user that transmitted the request and the device identification information of the plurality of devices owned by the second user that receive the request.

5. A control method of an information processing apparatus which has an information management unit configured to manage identification information of a first user and device identification information of a device owned by the first user in association with each other, manage identification information of a second user and device identification information of a plurality of devices owned by the second user in association with each other and manage the device identification information of the device owned by the first user that transmitted a request to the second user for associating the first user and the second user with each other, the device identification information of one of the devices owned by the second user that received the request, and information indicating a response state of a response to the request in association with each other; a control unit configured to control data transmission and reception between the device owned by the first user and the devices owned the second user by associating the identification information of the first user and the identification information of the second user with each other, the method comprising:
receiving a request to the second user issued from the first user, for associating the first user and the second user with each other;
transmitting the request from the first user to the plurality of devices owned by the second user;
associating the first user and the second user with each other in response to receiving permission information from one of the devices owned by the second user as a result of the second user performing a permission operation on the device;
transmitting a notification for canceling the request to at least one of the devices other than the device that transmitted the permission information among the plurality of devices owned by the second user; and
if there is a device that has already transmitted the permission information among the plurality of devices owned by the second user when the request from the device owned by the first user is received, notifying the device owned by the first user of presence of the device that has already transmitted the permission information.

6. A non-transitory computer-readable storage medium storing a program for causing a computer to execute a control method of an information processing apparatus which has an information management unit configured to manage identification information of a first user and device identification information of a device owned by the first user in association with each other, manage identification information of a second user and device identification information of a plurality of devices owned by the second user in association with each other and manage the device identification information of the device owned by the first user that transmitted a request to the second user for associating the first user and the second user with each other, the device identification information of one of the devices owned by the second user that received the request, and information indicating a response state of a response to the request in association with each other; and a control unit configured to control data transmission and reception between the device owned by the first user and the devices owned the second user by associating the identification information of the first user and the identification information of the second user with each other, the method comprising:

- receiving a request to the second user issued from the first user, for associating the first user and the second user with each other;
- transmitting the request from the first user to the plurality of devices owned by the second user;
- associating the first user and the second user with each other in response to receiving permission information from one of the devices owned by the second user as a result of the second user performing a permission operation on the device;
- transmitting a notification for canceling the request to at least one of the devices other than the device that transmitted the permission information among the plurality of devices owned by the second user; and
- if there is a device that has already transmitted the permission information among the plurality of devices owned by the second user when the request from the device owned by the first user is received, notifying the device owned by the first user of presence of the device that has already transmitted the permission information.

7. The method according to claim 5, further comprising:
upon receiving permission information from one of the devices owned by the second user that received the request, updating the information indicating the response state of the response to the request of a device other than the device that transmitted the permission information to "cancelled" or "permitted".

8. The method according to claim 5, further comprising:
notifying the device owned by the first user of a fact that the permission information has been received from one of the plurality of devices owned by the second user in response to the request.

9. The method according to claim 5, wherein the request includes the device identification information of the device owned by the first user that transmitted the request and the device identification information of the plurality of devices owned by the second user that receive the request.

10. The non-transitory computer readable medium according to claim 6, the method further comprising:
upon receiving permission information from one of the devices owned by the second user that received the request, updating the information indicating the response state of the response to the request of a device other than the device that transmitted the permission information to "cancelled" or "permitted".

11. The non-transitory computer readable medium according to claim 6, the method further comprising:
notifying the device owned by the first user of a fact that the permission information has been received from one of the plurality of devices owned by the second user in response to the request.

12. The non-transitory computer readable medium according to claim 5, wherein the request includes the device identification information of the device owned by the first user that transmitted the request and the device identification information of the plurality of devices owned by the second user that receive the request.

* * * * *